(12) United States Patent
Liu et al.

(10) Patent No.: US 12,052,695 B2
(45) Date of Patent: *Jul. 30, 2024

(54) METHOD AND DEVICE IN COMMUNICATION NODE USED FOR NON-TERRESTRIAL NETWORKS (NTN) WIRELESS COMMUNICATIONS

(71) Applicants: Zheng Liu, Shanghai (CN); Xiaobo Zhang, Shanghai (CN); Lin Yang, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,728

(22) Filed: Mar. 17, 2023

(65) Prior Publication Data

US 2023/0247598 A1 Aug. 3, 2023

Related U.S. Application Data

(63) Continuation of application No. 17/017,711, filed on Sep. 11, 2020, now Pat. No. 11,638,250, which is a (Continued)

(30) Foreign Application Priority Data

Jun. 1, 2018 (CN) .......................... 201810555670.8

(51) Int. Cl.
H04W 36/24 (2009.01)
H04L 1/1607 (2023.01)
(Continued)

(52) U.S. Cl.
CPC ....... *H04W 72/0446* (2013.01); *H04L 1/1678* (2013.01); *H04W 36/249* (2023.05);
(Continued)

(58) Field of Classification Search
CPC .............. H04W 36/249; H04W 72/231; H04L 1/1678; H04L 27/2666; H04L 27/2646
See application file for complete search history.

(56) References Cited

U.S. PATENT DOCUMENTS 11,638,250 B2 *   4/2023  Liu ....................... H04L 1/1678
                                                          370/336
2001/0036168 A1 * 11/2001  Terry .................. H04W 56/001
                                                          370/337

(Continued)

FOREIGN PATENT DOCUMENTS

CN    101689950 A    3/2010
CN    102036364 A    4/2011
(Continued)

OTHER PUBLICATIONS

3GPP, "TS 38.211 v.15.1.0", Mar. 2018, pp. 1-90 (Year: 2018).*

(Continued)

*Primary Examiner* — Salvador E Rivas

(57) ABSTRACT

The present disclosure provides a method and a device in a communication node for wireless communications. The communication node in the present disclosure first receives first information, and then transmits a first radio signal; a length of a time interval between a start time for transmitting
(Continued)

the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself. The present disclosure can improve uplink synchronization performance.

20 Claims, 12 Drawing Sheets

Related U.S. Application Data continuation of application No. PCT/CN2019/089052, filed on May 29, 2019.

(51) Int. Cl.
*H04W 72/0446* (2023.01)
*H04W 72/231* (2023.01)
*H04W 72/541* (2023.01)
*H04L 27/26* (2006.01)
*H04N 1/00* (2006.01)

(52) U.S. Cl.
CPC ....... *H04W 72/231* (2023.01); *H04W 72/541* (2023.01); *H04L 27/2666* (2013.01); *H04N 1/00933* (2013.01)

(56) References Cited

U.S. PATENT DOCUMENTS

| | | | |
|---|---|---|---|
| 2009/0017851 A1* | 1/2009 | Li | H04W 56/002 455/502 |
| 2016/0028533 A1* | 1/2016 | Kazmi | H04W 56/0045 370/296 |
| 2017/0359790 A1 | 12/2017 | Wang et al. | |
| 2018/0027511 A1* | 1/2018 | Yilmaz | H04L 7/0033 370/324 |
| 2018/0242317 A1* | 8/2018 | Marinier | H04L 1/1819 |

FOREIGN PATENT DOCUMENTS

| | | |
|---|---|---|
| CN | 102281626 A | 12/2011 |
| CN | 102917393 A | 2/2013 |
| CN | 105165076 A | 12/2015 |
| CN | 107787039 A | 3/2018 |

OTHER PUBLICATIONS

1st Office Action in application No. CN201810555670.8 received in dated Jun. 1, 2020.
1st Search Report in application No. CN201810555670.8 in dated May 23, 2020.
ISR in application PCT/CN2019/089052 dated Aug. 13, 2019.
3GPP TSG RANIMeeting #93 R1-1807864 Thales NR-NTN:solutionprinciples for NR tosupport non-terrestrialnetworks.
2nd Office Action in application No. CN201810555670.8 received in dated Sep. 22, 2020.

* cited by examiner

| Subcarrier spacing (kHz) | Minimum adjustment step-size |
|---|---|
| 15 | 16*64 Tc |
| 30 | 8*64 Tc |
| 60 | 4*64 Tc |
| 120 | 2*64 Tc |

FIG. 10

METHOD AND DEVICE IN COMMUNICATION NODE USED FOR NON-TERRESTRIAL NETWORKS (NTN) WIRELESS COMMUNICATIONS

CROSS REFERENCE TO RELATED APPLICATIONS

This application is a continuation of the U.S. patent application Ser. No. 17/017,711, filed on Sep. 11, 2020, which is a continuation of International Application PCT/CN2019/089052, filed May 29, 2019, claims the priority benefit of Chinese Patent Application No. 201810555670.8, filed on Jun. 1, 2018, the full disclosure of which is incorporated herein by reference.

BACKGROUND

Technical Field

The present disclosure relates to transmission methods and devices in wireless communication systems, and in particular to a transmission scheme and device in non-terrestrial wireless communications.

Related Art

Application scenarios of future wireless communication systems are becoming increasingly diversified, and different application scenarios have different performance demands on systems. In order to meet different performance requirements of various application scenarios, it was decided at $3^{rd}$ Generation Partner Project (3GPP) Radio Access Network (RAN) #72th plenary session that that a study on New Radio (NR), or what is called Fifth Generation (5G) shall be conducted. The work item (WI) of NR was approved at 3GPP RAN #75th plenary session to standardize NR.

To ensure better adaptability to various application scenarios and requirements, the 3GPP RAN #75th plenary session also approved a study item of NR-backed Non-Terrestrial Networks (NTN) starting with R15 version and started a WI to standardize relevant techniques in R16 version.

SUMMARY

In Non-Terrestrial Networks (NTN), a User Equipment (UE) is in communication with a satellite or an aircraft via 5G network. Since the distance from a satellite or an aircraft to a UE is much longer than that from a terrestrial base station to the UE, there will be a long propagation delay in communications between the satellite or aircraft and the UE. Besides, when a satellite is used as relay equipment for a terrestrial base station, the delay of a Feeder Link between the satellite and the terrestrial base station will lead to longer propagation delay between the UE and the base station. In the existing Long Term Evolution (LTE) or 5G NR system, in order to ensure synchronization of uplink transmissions to avoid interference for users and reduce scheduling complexity, a network equipment will configure a Timing Advance (TA) for uplink transmissions from a UE according to propagation delay. Because the existing TA configuration is designed for traditional terrestrial communications, which cannot be directly applied to NTN, so a new design is needed to support NTN communications. In particular, due to a very large propagation delay, a TA adjustment signaling may not reflect uplink synchronization status in time.

The disclosure provides a solution to the problem of uplink timing adjustment in NR NTN communications. It should be noted that the embodiments of a base station and the characteristics of the embodiments in the present disclosure may be applied to a UE if no conflict is incurred, and vice versa. Further, the embodiments and the characteristics of the embodiments in the present disclosure may be mutually combined if no conflict is incurred.

The present disclosure provides a method in a first-type communication node for wireless communications, comprising:
  receiving first information; and
  transmitting a first radio signal;
  herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface.

In one embodiment, the transmitter of the first radio signal determines the first timing adjustment out of the X candidate timing adjustments by itself, which provides an open-loop TA adjustment method, thus avoiding the problem that a TA adjustment is not timely incurred by a long propagation delay.

In one embodiment, the transmitter of the first radio signal determines the first timing adjustment out of the X candidate timing adjustments by itself, which ensures that the transmitter of the first radio signal adjusts a transmission timing of the first radio signal by itself according to real-time moving speed, geographical position, crystal-oscillator offset and other aspects in the implementation, thus guaranteeing uplink synchronization transmissions.

In one embodiment, the transmitter of the first radio signal determines the first timing adjustment out of the X candidate timing adjustments, and the first information is used for determining that the X candidate timing adjustments can limit a transmission timing of the first radio signal to limited possibilities, thus avoiding an excessive increase in complexity of a receiver at the receiving end.

According to one aspect of the present disclosure, the above method is characterized in also comprising:
  receiving a second radio signal;
  herein, the second radio signal is used for determining the first reference time.

According to one aspect of the present disclosure, the above method is characterized in also comprising:
  transmitting a third radio signal;
  herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; a start time for transmitting the third radio signal is earlier than a start time for transmitting the first radio signal.

According to one aspect of the present disclosure, the above method is characterized in also comprising:

receiving second information;

herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or a subcarrier spacing (SCS) of subcarriers occupied by the first radio signal; the second information is transmitted via the air interface.

According to one aspect of the present disclosure, the above method is characterized in also comprising:

receiving second information;

herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface; a minimum adjustment step-size of the target timing adjustment is related to an SCS of subcarriers occupied by the first radio signal.

According to one aspect of the present disclosure, the above method is characterized in also comprising:

receiving third information;

herein, the third information is used for determining an SCS of subcarriers occupied by the first radio signal; the third information is transmitted via the air interface.

The present disclosure provides a method in a second-type communication node for wireless communications, comprising:

transmitting first information; and receiving a first radio signal;

herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; the first information is transmitted via an air interface.

According to one aspect of the present disclosure, the above method is characterized in also comprising:

transmitting a second radio signal;

herein, the second radio signal is used for determining the first reference time.

According to one aspect of the present disclosure, the above method is characterized in also comprising:

receiving a third radio signal;

herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; a start time for transmitting the third radio signal is earlier than a start time for transmitting the first radio signal.

According to one aspect of the present disclosure, the above method is characterized in also comprising:

transmitting second information;

herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface.

According to one aspect of the present disclosure, the above method is characterized in also comprising:

transmitting second information;

herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface; a minimum adjustment step-size of the target timing adjustment is related to an SCS of subcarriers occupied by the first radio signal.

According to one aspect of the present disclosure, the above method is characterized in also comprising:

transmitting third information;

herein, the third information is used for determining an SCS of subcarriers occupied by the first radio signal; the third information is transmitted via the air interface.

The present disclosure provides a first-type communication node for wireless communications, comprising:

a first receiver, receiving first information; and a first transmitter, transmitting a first radio signal;

herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; the first information is transmitted via an air interface.

According to one aspect of the present disclosure, the above first-type communication node is characterized in that the first receiver also receives a second radio signal; and the second radio signal is used for determining the first reference time.

According to one aspect of the present disclosure, the above first-type communication node is characterized in that the first transmitter also transmits a third radio signal; herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; a start time for transmitting the third radio signal is earlier than a start time for transmitting the first radio signal.

According to one aspect of the present disclosure, the above first-type communication node is characterized in that the first receiver also receives second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface.

According to one aspect of the present disclosure, the above first-type communication node is characterized in that the first receiver also receives second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface; a minimum adjustment step-size of the target timing adjustment is related to an SCS of subcarriers occupied by the first radio signal.

According to one aspect of the present disclosure, the above first-type communication node is characterized in that the first receiver also receives third information; herein, the third information is used for determining an SCS of subcarriers occupied by the first radio signal; and the third information is transmitted via the air interface.

The present disclosure provides a second-type communication node for wireless communications, comprising:
    a second transmitter, transmitting first information; and
    a second receiver, receiving a first radio signal;

herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; the first information is transmitted via an air interface.

According to one aspect of the present disclosure, the above second-type communication node is characterized in that the second transmitter also transmits a second radio signal; herein, the second radio signal is used for determining the first reference time.

According to one aspect of the present disclosure, the above second-type communication node is characterized in that the second receiver also receives a third radio signal; herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; a start time for transmitting the third radio signal is earlier than a start time for transmitting the first radio signal.

According to one aspect of the present disclosure, the above second-type communication node is characterized in that the second transmitter also transmits second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; and the second information is transmitted via the air interface.

According to one aspect of the present disclosure, the above second-type communication node is characterized in that the second transmitter also transmits second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface; a minimum adjustment step-size of the target timing adjustment is related to an SCS of subcarriers occupied by the first radio signal.

According to one aspect of the present disclosure, the above second-type communication node is characterized in that the second transmitter also transmits third information, the third information being used for determining an SCS of subcarriers occupied by the first radio signal; and the third information is transmitted via the air interface.

In one embodiment, compared with the method of TA adjustment in the existing Terrestrial Networks, the present disclosure is featured with major technical edges as follows:

The present disclosure provides a method for UE to adjust TA by itself, on the basis of adjustment performed on TA by the network side, the UE can further perform a micro adjustment on TA according to the implementation (such as moving speed, geographical location, crystal-oscillator offset, etc.), so as to avoid the problem that TA adjustment is not timely incurred by a long propagation delay.

In the method of adjusting TA by UE itself provided in the present disclosure, the network side configures the UE to adjust TA range or possible values by itself, thus avoiding an excessive increase in complexity of receiver at the receiving end.

BRIEF DESCRIPTION OF THE DRAWINGS

Other features, objects and advantages of the present disclosure will become more apparent from the detailed description of non-restrictive embodiments taken in conjunction with the following drawings:

FIG. 10 illustrates a schematic diagram of a relation between a minimum adjustment step-size of a target timing adjustment and an SCS of subcarriers occupied by a first radio signal according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
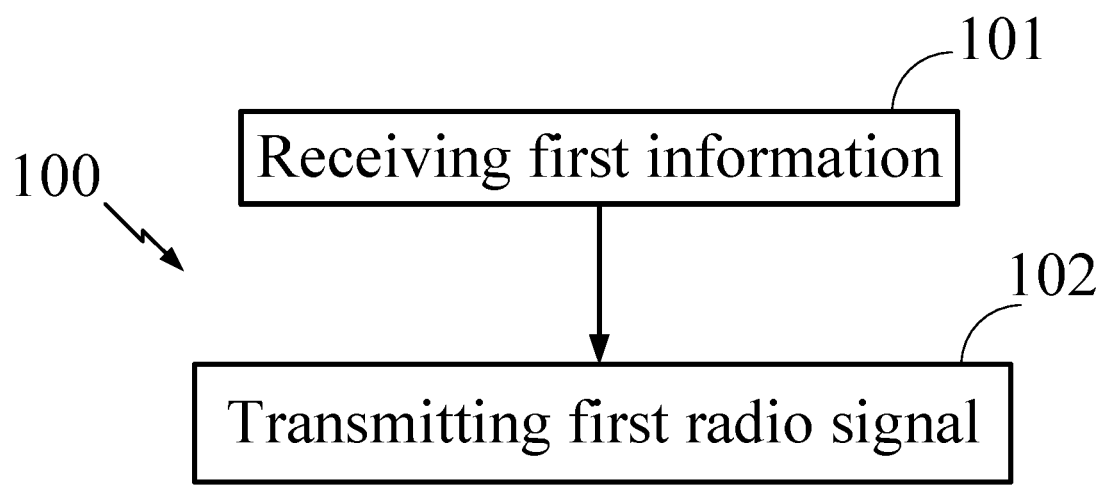
FIG. 1 illustrates a flowchart of first information and a first radio signal according to one embodiment of the present disclosure.

Embodiment 1 illustrates a flowchart of transmission of first information and a first radio signal according to one embodiment of the present disclosure, as shown in FIG. 1. In FIG. 1, each box represents a step. In Embodiment 1, the first-type communication node in the present disclosure first receives first information, and then transmits a first radio signal; herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; the first information is transmitted via an air interface.

In one embodiment, the first information is transmitted through a higher-layer signaling.

In one embodiment, the first information is transmitted through a physical-layer signaling.

In one embodiment, the first information comprises all or part of a higher-layer signaling.

In one embodiment, the first information comprises all or part of a physical-layer signaling.

In one embodiment, the first information comprises all or part of Information Elements (IE) in a Radio Resource Control (RRC) signaling.

In one embodiment, the first information comprises all or part of Fields in an IE in an RRC signaling.

In one embodiment, the first information comprises all or part of fields in a Medium Access Control (MAC) layer signaling.

In one embodiment, the first information comprises all or part of a MAC Control Element (CE).

In one embodiment, the first information comprises all or part of a MAC Header.

In one embodiment, the first information comprises all or part of a Random Access Response (RAR) MAC payload.

In one embodiment, the first information is transmitted through a Downlink Shared Channel (DL-SCH).

In one embodiment, the first information is transmitted through a Physical Downlink Shared Channel (PDSCH).

In one embodiment, the first information is Broadcast.

In one embodiment, the first information is Unicast.

In one embodiment, the first information is Cell-Specific.

In one embodiment, the first information is UE-specific.

In one embodiment, the first information is UE group-specific.

In one embodiment, the first information is transmitted through a Physical Downlink Control Channel (PDCCH).

In one embodiment, the first information comprises all or part of Fields of a Downlink Control Information (DCI) signaling.

In one embodiment, the first information being used for determining the X candidate timing adjustments means that the first information is used by the first-type communication node for determining the X candidate timing adjustments.

In one embodiment, the first information being used for determining the X candidate timing adjustments means that the first information is used for directly indicating the X candidate timing adjustments.

In one embodiment, the first information being used for determining the X candidate timing adjustments means that the first information is used for indirectly indicating the X candidate timing adjustments.

In one embodiment, the first information being used for determining the X candidate timing adjustments means that the first information is used for explicitly indicating the X candidate timing adjustments.

In one embodiment, the first information being used for determining the X candidate timing adjustments means that the first information is used for implicitly indicating the X candidate timing adjustments.

In one embodiment, frequency-domain resources occupied by the first radio signal belong to Licensed Spectrum.

In one embodiment, the first radio signal is transmitted through an Uplink Shared Channel (UL-SCH).

In one embodiment, the first radio signal is transmitted through a Physical Uplink Shared Channel (PUSCH).

In one embodiment, the first radio signal is transmitted through a Physical Uplink Control Channel (PUCCH).

In one embodiment, the first radio signal carries Uplink Control Information (UCI).

In one embodiment, the first radio signal is transmitted through a Sounding Reference Signal (SRS).

In one embodiment, the first radio signal is transmitted through an Uplink Demodulation Reference Signal (UL DMRS).

In one embodiment, the first radio signal is obtained by all or part of bits of a Transport Block (TB) sequentially subjected to TB CRC insertion, Code Block (CB) Segmentation, CB CRC insertion, Rate Matching, Concatenation, Scrambling, Modulation Mapper, Layer Mapper, Precoding, Resource Element Mapper, and Baseband Signal Generation.

In one embodiment, the first radio signal is obtained by all or part of bits of a TB sequentially subjected to TB CRC insertion, CB Segmentation, code block CRC insertion, Rate Matching, Concatenation, Scrambling, Modulation Mapper, Layer Mapper, Transform Precoding, Precoding, Resource Element Mapper, and Baseband Signal Generation.

In one embodiment, the first radio signal is obtained by all or part of bits of a positive integer number of CB(s) sequentially subjected to CB CRC insertion, Rate Matching, Concatenation, Scrambling, Modulation Mapper, Layer Mapper, Transform Precoding, Precoding, Resource Element Mapper, and Baseband Signal Generation.

In one embodiment, the first radio signal is obtained by all or part of bits of a positive integer number of CB(s) sequentially subjected to CB CRC insertion, Rate Matching, Concatenation, Scrambling, Modulation Mapper, Layer Mapper, Precoding, Resource Element Mapper, and Baseband Signal Generation.

In one embodiment, a start time for transmitting the first radio signal is no later than the first reference time.

In one embodiment, a start time for transmitting the first radio signal is earlier than the first reference time.

In one embodiment, a length of a time interval between a start time for transmitting the first radio signal and the first reference time is equal to a value of a TA of the first radio signal.

In one embodiment, a length of a time interval between a start time for transmitting the first radio signal and the first reference time is a value of a $T_{TA}$ in 3GPP TS38.211 (v15.1.0), section 4.3.1 corresponding to the first radio signal.

In one embodiment, the first timing adjustment and the second timing adjustment are both real numbers.

In one embodiment, units for measurement of the first timing adjustment and the second timing adjustment are both μs.

In one embodiment, the second timing adjustment is equal to an integer number of Tc(s) in 3GPP TS38.211 (v15.1.0).

In one embodiment, a minimum adjustment step-size of the first timing adjustment is not equal to a minimum adjustment step-size of the second timing adjustment.

In one embodiment, a minimum adjustment step-size of the first timing adjustment is equal to a minimum adjustment step-size of the second timing adjustment.

In one embodiment, a minimum adjustment step-size of the first timing adjustment is less than a minimum adjustment step-size of the second timing adjustment.

In one embodiment, a minimum adjustment step-size of the first timing adjustment is greater than a minimum adjustment step-size of the second timing adjustment.

In one embodiment, each of the X candidate timing adjustments is measured by μs.

In one embodiment, each of the X candidate timing adjustments comprises an integer number of Tc(s) in 3GPP TS38.211 (v15.1.0).

In one embodiment, each of the X candidate timing adjustments is a real number.

In one embodiment, each of the X candidate timing adjustments is a non-negative number.

In one embodiment, each of the X candidate timing adjustments is a positive real number.

In one embodiment, there exist one candidate timing adjustment in the X candidate timing adjustments being equal to 0.

In one embodiment, the X is a fixed positive integer.

In one embodiment, the X is a variable positive integer.

In one embodiment, the X is a predefined positive integer.

In one embodiment, the first information indicates the X.

In one embodiment, the second timing adjustment being used for determining a transmission timing of a radio signal transmitted before the first radio signal in time domain indicates that there exists a transmission timing of a radio signal before the first radio signal in time domain being determined by the second timing adjustment.

In one embodiment, the second timing adjustment being used for determining a transmission timing of a radio signal transmitted before the first radio signal in time domain indicates that there does not exist a transmission timing of a radio signal before the first radio signal in time domain being determined by the second timing adjustment.

In one embodiment, the second timing adjustment being used for determining a transmission timing of a radio signal transmitted before the first radio signal in time domain indicates that there does not exist a transmission timing of a radio signal before the first radio signal in time domain being determined by the second timing adjustment, and the first-type communication node still maintains (stores) the second timing adjustment.

In one embodiment, the second timing adjustment being used for determining a transmission timing of a radio signal transmitted before the first radio signal in time domain indicates that the first-type communication node expects that there exist a transmission timing of a radio signal before the first radio signal in time domain being determined by the second timing adjustment.

In one embodiment, the second timing adjustment being used for determining a transmission timing of a radio signal transmitted before the first radio signal in time domain refers that the second timing adjustment is used by the first-type communication node for determining a transmission timing of a radio signal transmitted before the first radio signal in time domain.

In one embodiment, the second timing adjustment being used for determining a transmission timing of a radio signal transmitted before the first radio signal in time domain refers that the second timing adjustment is used for directly calculating a transmission timing of a radio signal transmitted before the first radio signal in time domain.

In one embodiment, the second timing adjustment being used for determining a transmission timing of a radio signal transmitted before the first radio signal in time domain refers that the second timing adjustment is used for indirectly calculating a transmission timing of a radio signal transmitted before the first radio signal in time domain.

In one embodiment, the second timing adjustment being used for determining a transmission timing of a radio signal transmitted before the first radio signal in time domain refers that the second timing adjustment is used for explicitly calculating a transmission timing of a radio signal transmitted before the first radio signal in time domain.

In one embodiment, the second timing adjustment being used for determining a transmission timing of a radio signal transmitted before the first radio signal in time domain refers that the second timing adjustment is used for implicitly calculating a transmission timing of a radio signal transmitted before the first radio signal in time domain.

In one embodiment, a transmitter of the first radio signal determining the first timing adjustment out of the X candidate timing adjustments by itself refers that a transmitter of the first radio signal randomly selects the first timing adjustment out of the X candidate timing adjustments.

In one embodiment, a transmitter of the first radio signal determining the first timing adjustment out of the X candidate timing adjustments by itself refers that a transmitter of the first radio signal selects the first timing adjustment out of the X candidate timing adjustments according to a geographic position of a transmitter of the first radio signal when transmitting the first radio signal.

In one embodiment, a transmitter of the first radio signal determining the first timing adjustment out of the X candidate timing adjustments by itself refers that A transmitter of the first radio signal selects the first timing adjustment out of the X candidate timing adjustments according to a moving speed of a transmitter of the first radio signal when transmitting the first radio signal.

In one embodiment, a transmitter of the first radio signal determining the first timing adjustment out of the X candidate timing adjustments by itself refers that A transmitter of the first radio signal selects the first timing adjustment out of the X candidate timing adjustments according to a crystal-oscillator offset of a transmitter of the first radio signal when transmitting the first radio signal.

In one embodiment, the method that a transmitter of the first radio signal determines the first timing adjustment out of the X candidate timing adjustments by itself is implementation dependent.

In one embodiment, the air interface is wireless.

In one embodiment, the air interface comprises a wireless channel.

In one embodiment, the air interface is an interface between a second-type communication node and a first-type communication node.

In one embodiment, the air interface is a Uu interface.

Embodiment 2

Figure 2:
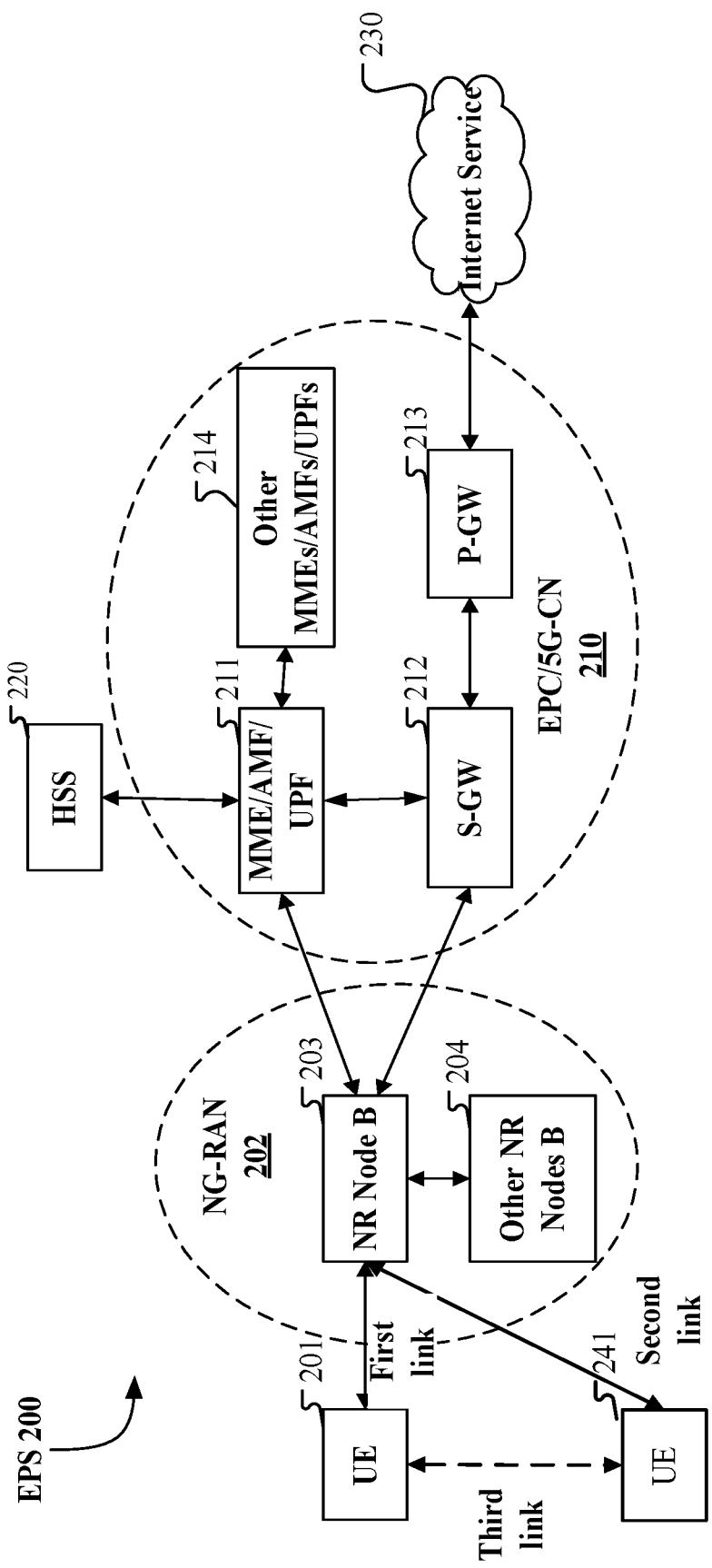
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may also be called a base station, a base transceiver station, a radio base station, a radio transceiver, a transceiver function, a Basic Service Set (BSS), an Extended Service Set (ESS), a Transmitter Receiver Point (TRP) or some other applicable terms. In NTN, the gNB 203 may be a satellite or a territorial base station relayed by satellites. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Services (PSSs).

In one embodiment, the UE 201 corresponds to the first-type communication node in the present disclosure.

In one embodiment, the UE 201 supports transmissions within NTN.

In one embodiment, the gNB 203 corresponds to the second-type communication node in the present disclosure.

In one embodiment, the gNB 203 supports transmissions within NTN.

Embodiment 3

Figure 3:
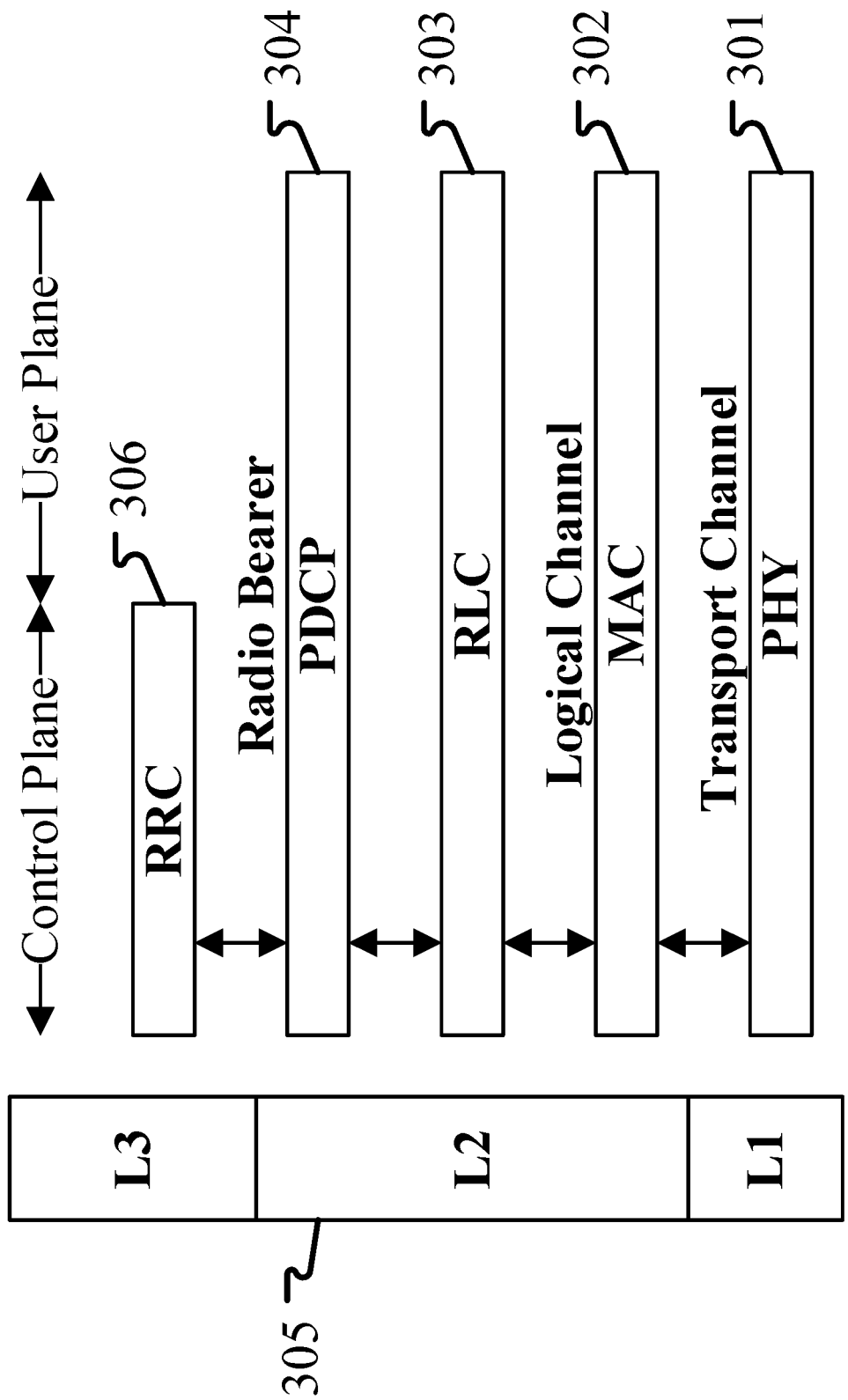
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane and a control plane. In FIG. 3, the radio protocol architecture for a first-type communication node (UE) and a second-type communication node (gNB, eNB or a satellite in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first-type communication node and the second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication node of the network side. Although not described in FIG. 3, the first-type communication node may comprise several higher layers above the L2 305, such as a network layer (e.g., IP layer) terminated at a P-GW of the network side and an application layer terminated at the other side of the connection (e.g., a peer UE, a server, etc.). The PDCP sublayer 304 provides multiplexing among variable radio bearers and logical channels. The PDCP sublayer 304 also provides a header compression for a higher-layer packet so as to reduce radio transmission overhead, provides security by encrypting a packet, and provides support for handover of a first-type communication node between second-type communication nodes. The RLC sublayer 303 provides segmentation and reassembling of a higher-layer packet, retransmission of a lost packet, and reordering of a data packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first-type communication nodes various radio resources (e.g., resource block) in a cell. The MAC sublayer 302 is also in charge of HARQ operation. In the control plane, the radio protocol architecture of the first-type communication node and the second-type communication node is almost the same as the radio protocol architecture on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first information in the present disclosure is generated by the RRC 306.

In one embodiment, the first information in the present disclosure is generated by the MAC 302.

In one embodiment, the first information in the present disclosure is generated by the PHY 301.

In one embodiment, the second information in the present disclosure is generated by the RRC 306.

In one embodiment, the second information in the present disclosure is generated by the MAC 302.

In one embodiment, the second information in the present disclosure is generated by the PHY 301.

In one embodiment, the third information in the present disclosure is generated by the RRC 306.

In one embodiment, the third information in the present disclosure is generated by the MAC 302.

In one embodiment, the third information in the present disclosure is generated by the PHY 301.

In one embodiment, the first radio signal in the present disclosure is generated by the RRC 306.

In one embodiment, the first radio signal in the present disclosure is generated by the MAC 302.

In one embodiment, the first radio signal in the present disclosure is generated by the PHY 301.

In one embodiment, the second radio signal in the present disclosure is generated by the RRC 306.

In one embodiment, the second radio signal in the present disclosure is generated by the MAC 302.

In one embodiment, the second radio signal in the present disclosure is generated by the PHY 301.

In one embodiment, the third radio signal in the present disclosure is generated by the RRC 306.

In one embodiment, the third radio signal in the present disclosure is generated by the MAC 302.

In one embodiment, the third radio signal in the present disclosure is generated by the PHY 301.

Embodiment 4

Figure 4:
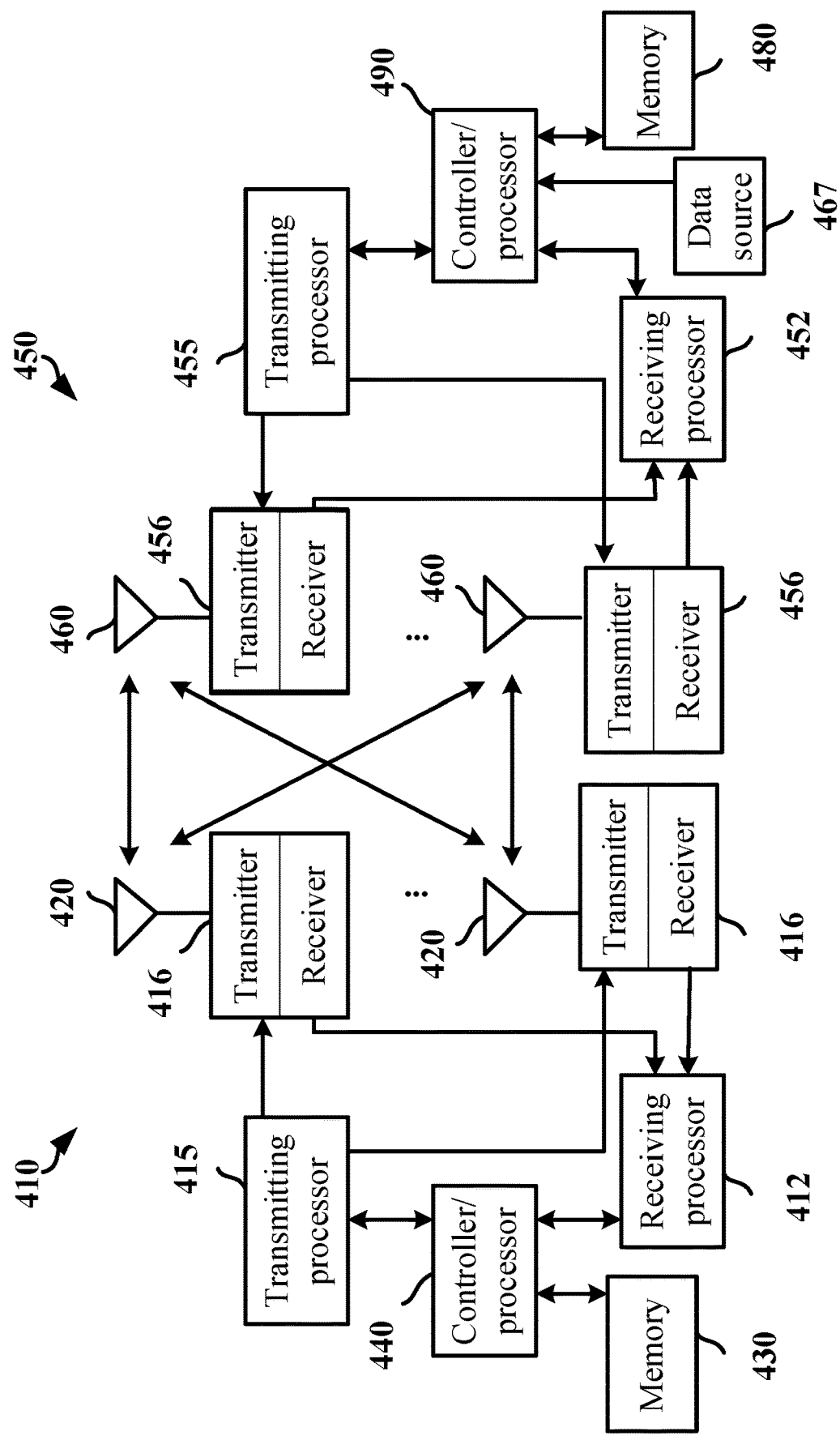
FIG. 4 illustrates a schematic diagram of a first-type communication node and a second-type of communication node according to one embodiment of the present disclosure.

Embodiment 4 illustrates a schematic diagram of a base station and a given UE according to the present disclosure, as shown in FIG. 4. FIG. 4 is a block diagram of a gNB/eNB 410 in communication with a UE 450 in an access network.

The UE 450 comprises a controller/processor 490, a memory 480, a receiving processor 452, a transmitter/receiver 456, a transmitting processor 455 and a data source 467, wherein the transmitter/receiver 456 comprises an antenna 460. A higher layer packet is provided to the controller/processor 490 by the data source 467, the controller/processor 490 provides header compression and decompression, encryption and decryption, packet segmentation and reordering, as well as a multiplexing and demultiplexing between a logical channel and a transport channel so as to implement the L2 layer protocols used for the user plane and the control plane. The higher layer packet may comprise data or control information, such as DL-SCH and UL-SCH. The transmitting processor 455 performs various signal transmitting processing functions used for the L1 layer (that is, PHY), including coding, interleaving, scrambling, modulation, power control/allocation, precoding and physical-layer control signaling generation. The receiving processor 452 performs various signal receiving processing functions used for the L1 layer (that is, PHY), including decoding, deinterleaving, descrambling, demodulation, de-precoding and extraction of physical layer control signaling. The transmitter 456 is configured to convert a baseband signal provided by the transmitting processor 455 into a radio-frequency (RF) signal and transmit it via the antenna 460, and the receiver 456 is configured to convert the RF signal received via the antenna 460 into a baseband signal to be provided to the receiving processor 452.

The base station (410) may comprise a controller/processor 440, a memory 430, a receiving processor 412, a transmitter/receiver 416, a transmitting processor 415, wherein the transmitter/receiver 416 comprises an antenna 420. A higher layer packet is provided to the controller/processor 440. The controller/processor 440 provides header compression and decompression, encryption and decryption, packet segmentation and reordering, as well as multiplexing and demultiplexing between a logical channel and a transport channel so as to implement the L2 layer protocols used for the user plane and the control plane. The higher layer packet may comprise data or control information, such as DL-SCH or UL-SCH. The transmitting processor 415 performs various signal transmitting processing functions used for the L1 layer (that is, PHY), including coding, interleaving, scrambling, modulation, power control/allocation, precoding and physical-layer signaling (i.e., synchronization signal, reference signal, etc.) generation. The receiving processor 412 performs various signal receiving processing functions used for the L1 layer (that is, PHY), including decoding, deinterleaving, descrambling, demodulation, de-precoding and extraction of physical-layer signaling. The transmitter 416 is configured to convert a baseband signal provided by the transmitting processor 415 into an RF signal and transmit it via the antenna 420, and the receiver 416 is configured to convert the RF signal received via the antenna 420 into a baseband signal to be provided to the receiving processor 412.

In Downlink (DL) transmission, a higher packet is provided to the controller/processor 440. The controller/processor 440 implements functions of L2 layer. In DL transmission, the controller/processor 440 provides header compression, encryption, packet segmentation and reordering, multiplexing between a logical channel and a transport channel, as well as radio resource allocation for the UE 450 based on various priorities. The controller/processor 440 is also responsible for HARQ operation, retransmission of a lost packet, and a signaling to the UE 450, such as the first information, the second information and the third information in the present disclosure are all generated in the controller/processor 440. The transmitting processor 415 performs various signal processing functions used for the L1 layer (i.e., PHY), including coding and interleaving, so as to promote Forward Error Correction (FEC) at the UE 450 side, and modulation of baseband signals based on various modulation schemes (i.e., BPSK, QPSK). Modulation symbols are divided into parallel streams and each stream is mapped onto a corresponding multicarrier subcarrier and/or multicarrier symbol, which is later mapped from the transmitting processor 415 to the antenna 420 via the transmitter 416 to be transmitted in the form of RF signal. Corresponding channels of the first information, the second information, the third information and the second radio signal of the present disclosure on physical layer are mapped from the transmitting processor 415 to a target radio resource and then mapped from the transmitter 416 to the antenna 420 to be transmitted in the form of RF signals. At the receiving end, each receiver 456 receives an RF signal via a corresponding antenna 460; each receiver 456 recovers baseband information modulated to the RF carrier, and provides the baseband information to the receiving processor 452. The receiving processor 452 performs various signal receiving and processing functions of the L1 layer. The signal receiving and processing functions include reception of physical layer signals carrying the first information, the second information, the third information, and a second radio signal in the present disclosure; demodulation of multicarrier symbols in multicarrier symbol streams based on each modulation scheme (e.g., BPSK, QPSK), and the decoding and de-interleaving to recover data or control signals transmitted by the gNB 410 on the physical channel, and the data or control signals are later provided to the controller/processor 490. The controller/processor 490 implements functions of L2 layer. The controller/processor may be associated with the memory 480 that stores program codes and data. The memory 480 can be called a computer readable medium.

In uplink (UL) transmission, the data source 467 is used to provide a first radio signal and a third radio signal in the present disclosure to the controller/processor 490. The data source 467 represents all protocol layers above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the gNB 410. The controller/processor 490 is also in charge of HARQ operation, retransmission of a lost packet, and a signaling to the gNB 410. The transmitting processor 455 performs various signal processing functions on the layer L1 (i.e., PHY). The signal transmission processing functions include coding and interleaving so as to facilitate Forward Error Correction (FEC) at the UE 350 as well as modulation of baseband signals based on various modulation schemes. Modulation symbols are divided into parallel streams and each stream is mapped onto a corresponding multicarrier subcarrier and/or multicarrier symbol for baseband signal generation, which is later mapped from the transmitting processor 455 to the antenna 460 via the transmitter 456 to be transmitted in the form of RF signal. Signals on physical layer (including the first radio signal and the third radio signal in the present disclosure) are generated by the transmitting processor 455. The receiver 416 receives an RF signal via a corresponding antenna 420, and each receiver 416 recovers baseband information modulated to an RF carrier, and provides the baseband information to the receiving processor 412. The receiving processor 412 provides various signal receiving and processing functions for the L1 layer (i.e., PHY), including acquisition of multi-carrier symbol streams, demodulation of multicarrier symbols in the multicarrier symbol streams based on each modulation scheme, then the decoding and de-interleaving to recover data and/or control signals originally transmitted by the UE 450 on the PHY. The data and the control signals are then provided to the controller/processor 440. The controller/processor 440 performs functions of L2 layer. The controller/processor may be associated with the memory 430 that stores program codes and data. The memory 430 can be called a computer readable medium.

In one embodiment, the UE 450 corresponds to the first-type communication node in the present disclosure.

In one embodiment, the gNB 410 corresponds to the second-type communication node in the present disclosure.

In one embodiment, the UE 450 comprises at least one processor and at least one memory. The at least one memory comprises computer program codes; the at least one memory and the computer program codes are configured to be used in collaboration with the at least one processor. The UE 450 at least: receives first information; and transmits a first radio signal; herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface.

In one embodiment, the UE 450 comprises a memory that stores a computer readable instruction program. The computer readable instruction program generates an action when executed by at least one processor. The action includes: receiving first information; and transmitting a first radio signal; herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface.

In one embodiment, the eNB 410 comprises: at least one processor and at least one memory. The at least one memory comprises computer program codes; the at least one memory and the computer program codes are configured to be used in collaboration with the at least one processor. The gNB 410 at least: transmits first information; and receives a first radio signal; herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface.

In one embodiment, the eNB 410 comprises a memory that stores a computer readable instruction program. The computer readable instruction program generates an action when executed by at least one processor. The action includes: transmitting first information; and receiving a first radio signal; herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface.

In one embodiment, the receiver 456 (comprising the antenna 460), the receiving processor 452 and the controller/processor 490 are used to receive the first information in the present disclosure.

In one embodiment, the receiver 456 (comprising the antenna 460), the receiving processor 452 and the controller/processor 490 are used to receive the second information in the present disclosure.

In one embodiment, the receiver 456 (comprising the antenna 460), the receiving processor 452 and the controller/processor 490 are used to receive the third information in the present disclosure.

In one embodiment, the transmitter 456 (comprising the antenna 460), the transmitting processor 455 and the controller/processor 490 are used to transmit the first radio signal in the present disclosure.

In one embodiment, the receiver 456 (comprising the antenna 460) and the receiving processor 452 are used for receiving the second radio signal in the present disclosure.

In one embodiment, the transmitter 456 (comprising the antenna 460), the transmitting processor 455 and the controller/processor 490 are used to transmit the third radio signal in the present disclosure.

In one embodiment, the transmitter 416 (comprising the antenna 420), the transmitting processor 415 and the controller/processor 440 are used to transmit the first information in the present disclosure.

In one embodiment, the transmitter 416 (comprising the antenna 420), the transmitting processor 415 and the controller/processor 440 are used to transmit the second information in the present disclosure.

In one embodiment, the transmitter 416 (comprising the antenna 420), the transmitting processor 415 and the controller/processor 440 are used to transmit the third information in the present disclosure.

In one embodiment, the receiver 416 (comprising the antenna 420), the receiving processor 412 and the controller/processor 440 are used to receive the first radio signal in the present disclosure.

In one embodiment, the transmitter 416 (comprising the antenna 420) and the transmitting processor 415 are used to transmit the second radio signal in the present disclosure.

In one embodiment, the receiver 416 (comprising the antenna 420), the receiving processor 412 and the controller/processor 440 are used to receive the third radio signal in the present disclosure.

Embodiment 5

Figure 5:
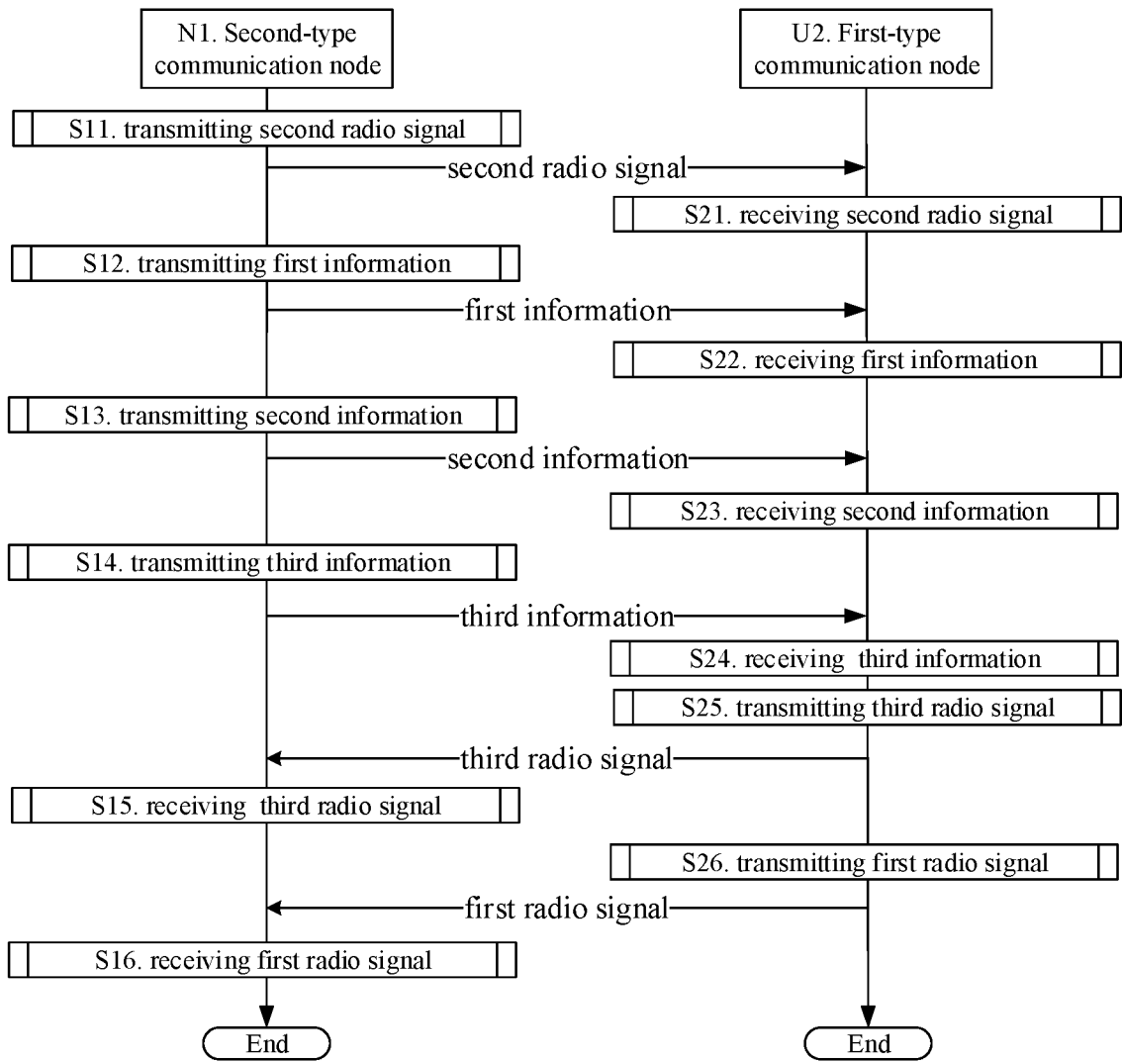
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a second-type communication node N1 is a maintenance base station of a serving cell of a first-type communication node U2.

The second-type communication node N1 transmits a second radio signal in step S11, transmits first information in step S12, transmits second information in step S13, transmits third information in step S14, receives a third radio signal in step S15, and receives a first radio signal in step S16.

The first-type communication node U2 receives a second radio signal in step S21, receives first information in step S22, received second information in step S23, receives third information in step S24, transmits a third radio signal in step S25, and transmits a first radio signal in step S26.

In Embodiment 5, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; the first information is transmitted via an air interface; the second radio signal is used for determining the first reference time; the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; a start time for transmitting the third radio signal is earlier than a start time for transmitting the first radio signal; the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface; the third information is used for determining an SCS of subcarriers occupied by the first radio signal; and the third information is transmitted via the air interface.

In one embodiment, the second information is the first information in the present disclosure.

In one embodiment, the second information is one piece of information other than the first information in the present disclosure.

In one embodiment, the second information is the same as the first information in the present disclosure.

In one embodiment, the second information is different from the first information in the present disclosure.

In one embodiment, the first information and second information in the present disclosure are transmitted through a same signaling.

In one embodiment, the first information and second information in the present disclosure are transmitted through a same RRC signaling.

In one embodiment, the first information and second information in the present disclosure are transmitted through different signalings.

In one embodiment, the first information and second information in the present disclosure are transmitted through a same physical channel.

In one embodiment, the first information and second information in the present disclosure are transmitted through different physical channels.

In one embodiment, the first information and the second information in the present disclosure are transmitted through a same PDSCH.

In one embodiment, the first information and the second information in the present disclosure are transmitted through two different PDSCHs.

In one embodiment, the first information and the second information are transmitted through a same signaling after subjected to joint coding.

In one embodiment, the first information and the second information in the present disclosure are transmitted as a same field in a same signaling after subjected to joint coding.

In one embodiment, the third information and the second information are transmitted as two different fields in a same signaling.

In one embodiment, the first information and the second information in the present disclosure are transmitted as a same IE in a same RRC signaling after subjected to joint coding.

In one embodiment, the first information and the second information in the present disclosure are transmitted as two different IEs in a same RRC signaling.

In one embodiment, the first information and the second information in the present disclosure are transmitted as two different CEs in a same MAC signaling.

In one embodiment, the first information and the second information in the present disclosure are transmitted as two fields in a same CE in a same MAC signaling after subjected to joint coding.

In one embodiment, the second information is transmitted through a higher-layer signaling.

In one embodiment, the second information is transmitted through a physical-layer signaling.

In one embodiment, the second information comprises all or part of a higher-layer signaling.

In one embodiment, the second information comprises all or part of a physical-layer signaling.

In one embodiment, the second information comprises all or part of IEs in an RRC signaling.

In one embodiment, the second information comprises all or part of Fields in an IE in an RRC signaling.

In one embodiment, the second information comprises all or part of fields of a CE in a MAC-layer signaling.

In one embodiment, the second information is transmitted through a DL-SCH.

In one embodiment, the second information is transmitted through a PDSCH.

In one embodiment, the second information is Broadcast.

In one embodiment, the second information is Unicast.

In one embodiment, the second information is Cell-Specific.

In one embodiment, the second information is UE-specific.

In one embodiment, the second information is transmitted through a PDCCH.

In one embodiment, the second information comprises all or part of Fields of a DCI signaling.

In one embodiment, the second information being used for determining the target timing adjustment means that the second information is used by the first-type communication node for determining the target timing adjustment.

In one embodiment, the second information being used for determining the target timing adjustment means that the second information is used for directly indicating the target timing adjustment.

In one embodiment, the second information being used for determining the target timing adjustment means that the second information is used for indirectly indicating the target timing adjustment.

In one embodiment, the second information being used for determining the target timing adjustment means that the second information is used for explicitly indicating the target timing adjustment.

In one embodiment, the second information being used for determining the target timing adjustment means that the second information is used for implicitly indicating the target timing adjustment.

In one embodiment, the third information is transmitted through a higher-layer signaling.

In one embodiment, the third information is transmitted through a physical-layer signaling.

In one embodiment, the third information comprises all or part of a higher-layer signaling.

In one embodiment, the third information comprises all or part of a physical-layer signaling.

In one embodiment, the third information comprises all or part of IEs in an RRC signaling.

In one embodiment, the third information comprises all or part of Fields in an IE in an RRC signaling.

In one embodiment, the third information comprises all or part of fields of a CE in a MAC-layer signaling.

In one embodiment, the third information is transmitted through a DL-SCH.

In one embodiment, the third information is transmitted through a PDSCH.

In one embodiment, the third information comprises all or part of fields in Remaining System Information (RMSI).

In one embodiment, the third information is Broadcast.

In one embodiment, the third information is Unicast.

In one embodiment, the third information is Cell-Specific.

In one embodiment, the third information is UE-specific.

In one embodiment, the third information is transmitted through a PDCCH.

In one embodiment, the third information comprises all or part of Fields of a DCI signaling.

In one embodiment, the third information being used for determining an SCS of subcarriers occupied by the first radio signal means that the third information is used by the first-type communication node for determining an SCS of subcarriers occupied by the first radio signal.

In one embodiment, the third information being used for determining an SCS of subcarriers occupied by the first radio signal means that the third information is used for directly indicating an SCS of subcarriers occupied by the first radio signal.

In one embodiment, the third information being used for determining an SCS of subcarriers occupied by the first radio signal means that the third information is used for indirectly indicating an SCS of subcarriers occupied by the first radio signal.

In one embodiment, the third information being used for determining an SCS of subcarriers occupied by the first radio signal means that the third information is used for explicitly indicating an SCS of subcarriers occupied by the first radio signal.

In one embodiment, the third information being used for determining an SCS of subcarriers occupied by the first radio signal means that the third information is used for implicitly indicating an SCS of subcarriers occupied by the first radio signal.

Embodiment 6

Figure 6:
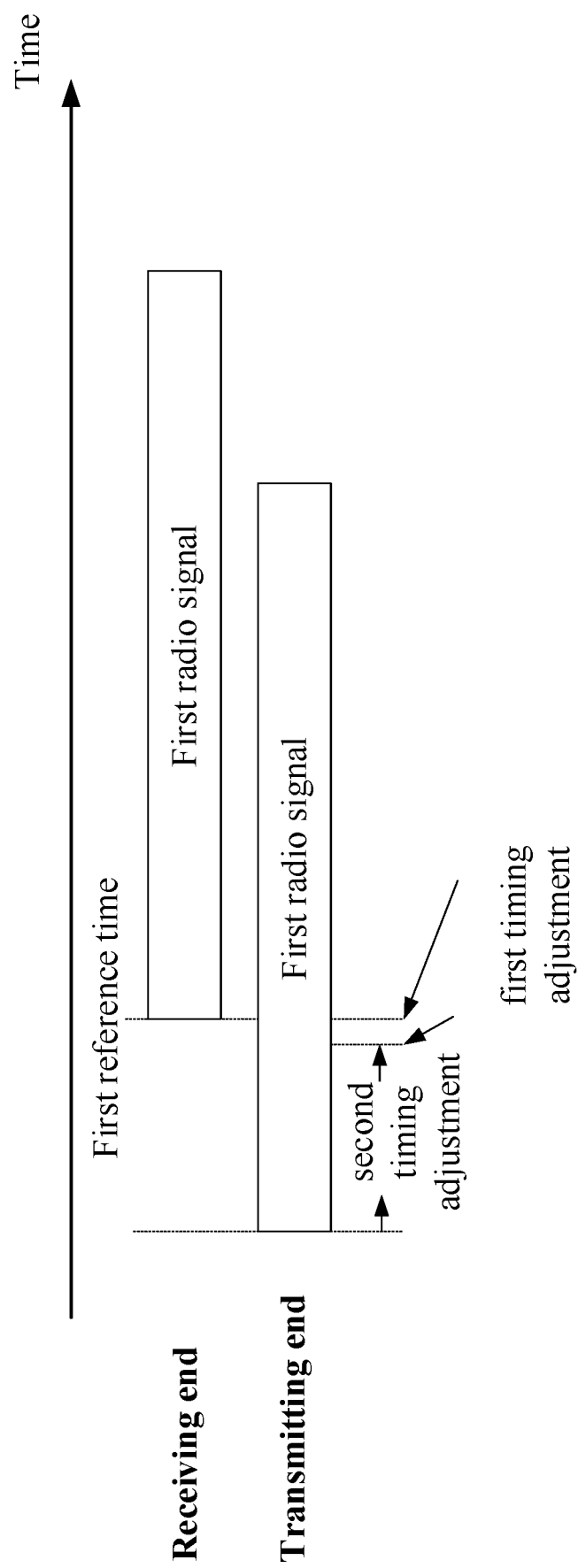
FIG. 6 illustrates a schematic diagram of relations among a first timing adjustment, a second timing adjustment and a start time for transmitting a first radio signal according to one embodiment of the present disclosure.

Embodiment 6 illustrates a schematic diagram of relations among a first timing adjustment, a second timing adjustment and a start time for transmitting a first radio signal according to one embodiment of the present disclosure, as shown in FIG. 6. In FIG. 6, the horizontal axis represents time, and the rectangle represents a first radio signal.

In Embodiment 6, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; and a transmitter of the first radio signal determines the first timing adjustment out of the X candidate timing adjustments by itself.

In one embodiment, a start time for transmitting the first radio signal is no later than the first reference time.

In one embodiment, a start time for transmitting the first radio signal is earlier than the first reference time.

In one embodiment, a length of a time interval between a start time for transmitting the first radio signal and the first reference time is equal to a value of a TA of the first radio signal.

In one embodiment, a length of a time interval between a start time for transmitting the first radio signal and the first reference time is a value of a $T_{TA}$ in 3GPP TS38.211 (v15.1.0), section 4.3.1 corresponding to the first radio signal.

In one embodiment, each of the X candidate timing adjustments comprises an integer number of Tc(s) in 3GPP TS38.211 (v15.1.0).

Embodiment 7

Figure 7:
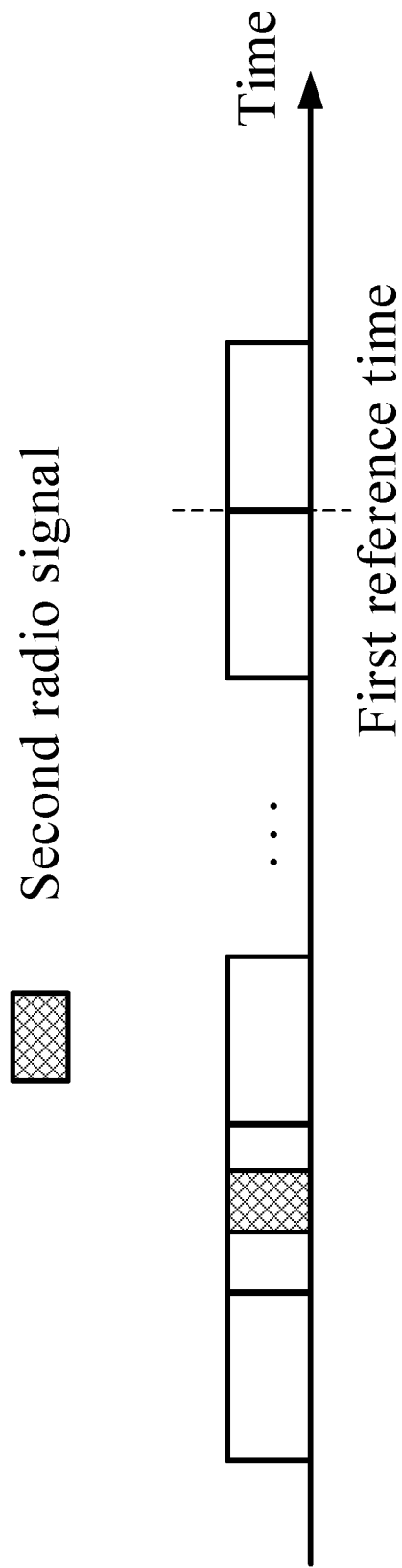
FIG. 7 illustrates a schematic diagram of a relation between a second radio signal and a first reference time according to one embodiment of the present disclosure.

Embodiment 7 illustrates a schematic diagram of a relation between a second radio signal and a first reference time according to one embodiment of the present disclosure, as shown in FIG. 7. In FIG. 7, the horizontal axis represents time length, the rectangle filled with cross lines represents a second radio signal, and each unfilled rectangle represents a time-domain scheduling unit, comprising subframes, slots, sub-slots, multicarrier symbols, etc. In Embodiment 7, the second radio signal in the present disclosure is used for determining the first reference time in the present disclosure.

In one embodiment, the second radio signal being used for determining the first reference time means that the second radio signal is used for determining a timing of a downlink subframe, and the first reference time is a boundary time of a downlink subframe.

In one embodiment, the second radio signal being used for determining the first reference time means that the second radio signal is used for determining a timing of a downlink radio frame, and the first reference time is a boundary time of a downlink radio frame.

In one embodiment, the second radio signal being used for determining the first reference time means that the second radio signal is used for determining a timing of a downlink slot, and the first reference time is a boundary time of a downlink slot.

In one embodiment, the second radio signal being used for determining the first reference time means that the second radio signal is used for determining a timing of a downlink sub-slot, and the first reference time is a boundary time of a downlink sub-slot.

In one embodiment, the second radio signal being used for determining the first reference time means that the second radio signal is used for determining a timing of a downlink multicarrier symbol, and the first reference time is a boundary time of a downlink multicarrier symbol.

In one embodiment, the second radio signal being used for determining the first reference time means that the second radio signal is used for determining a timing of an Orthogonal Frequency Division Multiplexing (OFDM) symbol, and the first reference time is a boundary time of a downlink OFDM symbol.

In one embodiment, the second radio signal being used for determining the first reference time means that the second radio signal is used for determining a timing of a downlink slot in the case of a given SCS, and the first reference time is a boundary time of a downlink slot of a given SCS.

In one embodiment, the second radio signal being used for determining the first reference time means that the second radio signal is used for determining a timing of a downlink slot in the case of a Numerology, and the first reference time is a boundary time of a downlink slot of a given Numerology.

In one embodiment, the second radio signal being used for determining the first reference time means that the second radio signal is used for determining a timing of a downlink OFDM symbol in the case of a given SCS, and the first reference time is a boundary time of a downlink OFDM symbol of a given SCS.

In one embodiment, the second radio signal being used for determining the first reference time means that the second radio signal is used for determining a timing of a downlink OFDM symbol in the case of a Numerology, and the first reference time is a boundary time of a downlink OFDM symbol of a given Numerology.

In one embodiment, the first-type communication node determines the first reference time by performing correlated operations on the second radio signal.

In one embodiment, a method that the second radio signal is used for determining the first reference time is implementation dependent.

In one embodiment, the second radio signal being used for determining the first reference time means that the second radio signal is used for directly indicating the first reference time.

In one embodiment, the second radio signal being used for determining the first reference time means that the second radio signal is used for indirectly indicating the first reference time.

In one embodiment, the second radio signal being used for determining the first reference time means that the second radio signal is used for implicitly indicating the first reference time.

In one embodiment, the second radio signal being used for determining the first reference time means that the second radio signal is used for explicitly indicating the first reference time.

In one embodiment, the second radio signal comprises a Synchronization Signal (SS).

In one embodiment, the second radio signal comprises a Primary Synchronization Signal (PSS) and a Secondary Synchronization Signal (SSS).

In one embodiment, the second radio signal comprises a PSS.

In one embodiment, the second radio signal comprises an SSS.

In one embodiment, the second radio signal comprises a Physical Broadcast Channel (PBCH).

In one embodiment, the second radio signal does not comprise a PBCH.

In one embodiment, the second radio signal comprises an SS/PBCH Block.

In one embodiment, the second radio signal comprises a PSS, an SSS, and a PB CH.

In one embodiment, the second radio signal is one transmission of a PSS.

In one embodiment, the second radio signal is one transmission of an SSS.

In one embodiment, the second radio signal is one transmission of a PSS and an SSS.

In one embodiment, the second radio signal is one transmission of an SS/PBCH Block.

Embodiment 8

Figure 8:
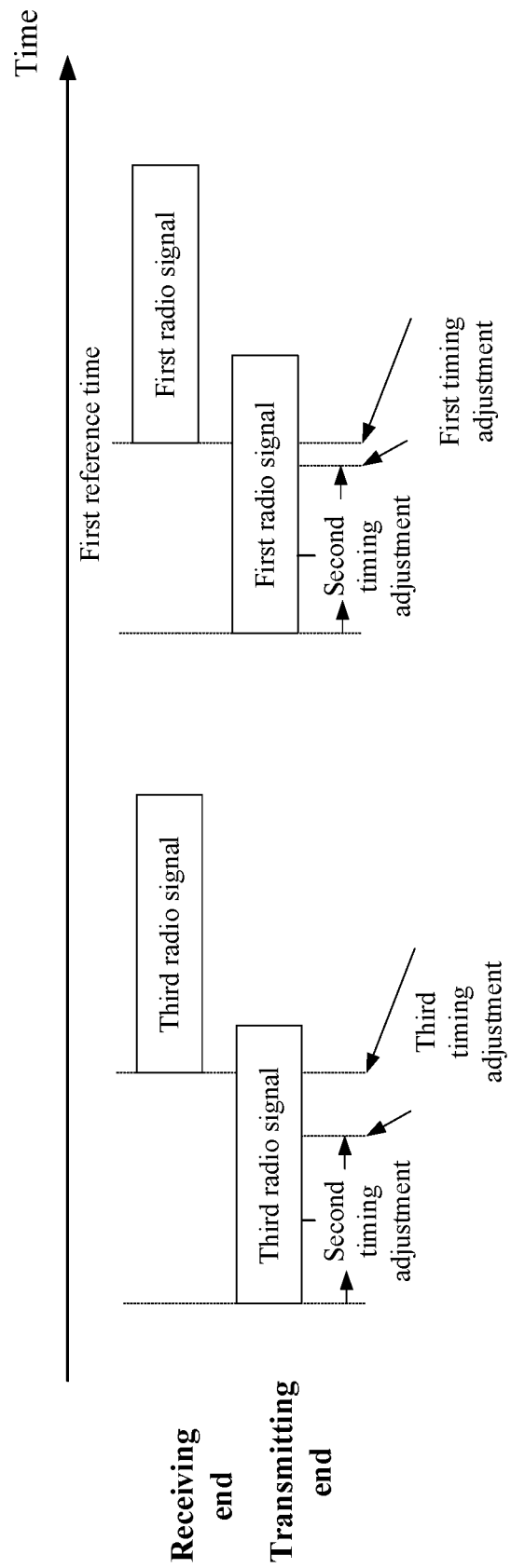
FIG. 8 illustrates a schematic diagram of a relation between a third radio signal and a first radio signal according to one embodiment of the present disclosure.

Embodiment 8 illustrates a schematic diagram of a relation between a third radio signal and a first radio signal according to one embodiment of the present disclosure, as shown in FIG. 8. In FIG. 8, the horizontal axis represents time, the upper rectangles respectively represent a first radio signal and a third radio signal at the receiving end, and the lower rectangles respectively represent a first radio signal and a third radio signal at the transmitting end.

In Embodiment 8, the second timing adjustment in the present disclosure is used for determining a transmission timing of the third radio signal in the present disclosure, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; and a start time for transmitting the third radio signal is earlier than a start time for transmitting the first radio signal in the present disclosure.

In one embodiment, frequency-resources occupied by the third radio signal belong to licensed spectrum.

In one embodiment, the third radio signal is transmitted through a UL-SCH.

In one embodiment, the third radio signal is transmitted through a PUSCH.

In one embodiment, the third radio signal is transmitted through a PUCCH.

In one embodiment, the third radio signal carries UCI.

In one embodiment, the third radio signal is transmitted through an SRS.

In one embodiment, the third radio signal is transmitted through a UL DMRS.

In one embodiment, the third radio signal is obtained by all or part of bits of a TB sequentially subjected to TB CRC insertion, CB Segmentation, CB CRC insertion, Rate Matching, Concatenation, Scrambling, Modulation Mapper, Layer Mapper, Precoding, Resource Element Mapper, and Baseband Signal Generation.

In one embodiment, the third radio signal is obtained by all or part of bits of a TB sequentially subjected to TB CRC insertion, CB Segmentation, CB CRC insertion, Rate Matching, Concatenation, Scrambling, Modulation Mapper, Layer Mapper, Transform Precoding, Precoding, Resource Element Mapper, and Baseband Signal Generation.

In one embodiment, the third radio signal is obtained by all or part of bits of a positive integer number of CB(s) sequentially subjected to CB CRC insertion, Rate Matching, Concatenation, Scrambling, Modulation Mapper, Layer Mapper, Transform Precoding, Precoding, Resource Element Mapper, and Baseband Signal Generation.

In one embodiment, the third radio signal is obtained by all or part of bits of a positive integer number of CB(s) sequentially subjected to CB CRC insertion, Rate Matching, Concatenation, Scrambling, Modulation Mapper, Layer Mapper, Precoding, Resource Element Mapper, and Baseband Signal Generation.

In one embodiment, the second timing adjustment is equal to a value of a TA corresponding to the third radio signal.

In one embodiment, the second timing adjustment is equal to a value of a $T_{TA}$ in 3GPP TS38.211 (v15.1.0), section 4.3.1 corresponding to the third radio signal.

In one embodiment, a sum of the second timing adjustment and the third timing adjustment is equal to a value of a TA corresponding to the third radio signal.

In one embodiment, a sum of the second timing adjustment and the third timing adjustment is equal to a value of a $T_{TA}$ in 3GPP TS38.211 (v15.1.0), section 4.3.1 corresponding to the third radio signal.

In one embodiment, the third timing adjustment is a real number.

In one embodiment, the third timing adjustment is measured by μs.

In one embodiment, the third timing adjustment is equal to an integer number of Tc(s) in 3GPP TS38.211 (v15.1.0).

In one embodiment, a minimum adjustment step-size of the third timing adjustment is not equal to a minimum adjustment step-size of the second timing adjustment.

In one embodiment, the Y is equal to the X, and the Y candidate timing adjustments are the X candidate timing adjustments.

In one embodiment, any of the Y candidate timing adjustments is one of the X candidate timing adjustments.

In one embodiment, there exists one candidate timing adjustment of the Y candidate timing adjustments being one candidate timing adjustment other than the X candidate timing adjustments.

In one embodiment, each of the Y candidate timing adjustments is measured by μs.

In one embodiment, each of the Y candidate timing adjustments comprises a positive integer number of Tc(s) in 3GPP TS38.211 (v15.1.0).

In one embodiment, each of the Y candidate timing adjustments is a real number.

In one embodiment, the Y is a fixed positive integer.

In one embodiment, the Y is a variable positive integer.

In one embodiment, the Y is a predefined positive integer.

In one embodiment, a transmitter of the third radio signal determining the third timing adjustment out of the Y candidate timing adjustments by itself means that a transmitter of the third radio signal randomly selects the third timing adjustment out of the Y candidate timing adjustments.

In one embodiment, a transmitter of the third radio signal determining the third timing adjustment out of the Y candidate timing adjustments by itself means that a transmitter of the third radio signal selects the third timing adjustment out of the Y candidate timing adjustments according to a geographic position of the transmitter of the third radio signal when transmitting the third radio signal.

In one embodiment, a transmitter of the third radio signal determining the third timing adjustment out of the Y candidate timing adjustments by itself means that a transmitter of the third radio signal selects the third timing adjustment out of the Y candidate timing adjustments according to a moving speed of the transmitter of the third radio signal when transmitting the third radio signal.

In one embodiment, a transmitter of the third radio signal determining the third timing adjustment out of the Y candidate timing adjustments by itself means that a transmitter of the third radio signal selects the third timing adjustment out of the Y candidate timing adjustments according to a crystal-oscillator offset of the transmitter of the third radio signal when transmitting the third radio signal.

In one embodiment, a method that a transmitter of the third radio signal determines the third timing adjustment out of the Y candidate timing adjustments by itself is implementation dependent.

In one embodiment, a transmission timing of the third radio signal refers to a start time for transmitting the third radio signal.

In one embodiment, a transmission timing of the third radio signal refers to an end time for transmitting the third radio signal.

In one embodiment, a transmission timing of the third radio signal refers to a position of time-domain resources occupied by the third radio signal in time domain.

Embodiment 9

Figure 9:
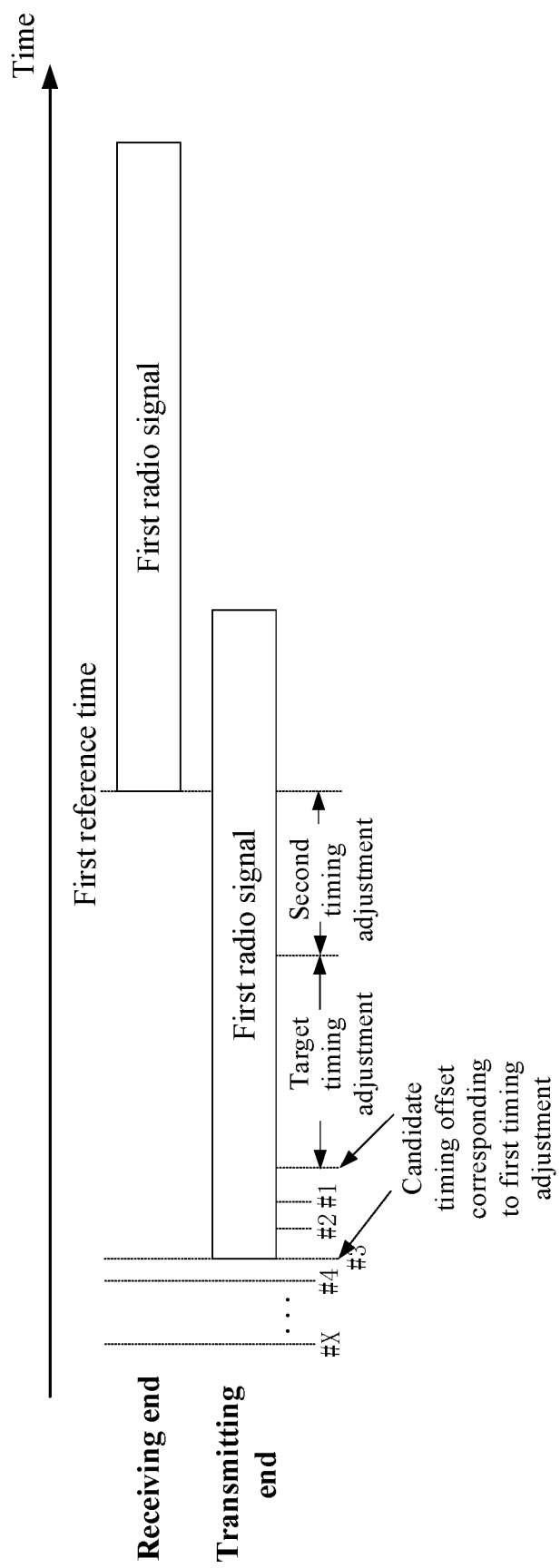
FIG. 9 illustrates a schematic diagram of a relation between a first timing adjustment and a target timing adjustment according to one embodiment of the present disclosure.

Embodiment 9 illustrates a schematic diagram of a relation between a first timing adjustment and a target timing adjustment according to one embodiment of the present disclosure, as shown in FIG. 9. In FIG. 9, the horizontal axis represents time, and the upper and lower rectangles respectively represent first radio signals at the receiving end and the transmitting end.

In Embodiment 9, the X candidate timing adjustments in the present disclosure are respectively equal to X candidate timing offsets plus a target timing adjustment, the second information in the present disclosure is used for determining the target timing adjustment, and a transmitter of the first radio signal in the present disclosure selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal.

In one embodiment, each of the X candidate timing offsets is a real number.

In one embodiment, each of the X candidate timing offsets is measured by μs.

In one embodiment, a unit for measurement of each of the X candidate timing offsets is the same as a unit for measurement of any of the X candidate timing adjustments.

In one embodiment, the X candidate timing offsets are equal to an integer number of Tc(s) in 3GPP TS38.211 (v15.1.0).

In one embodiment, the target timing adjustment is a real number.

In one embodiment, the target timing adjustment is measured by μs.

In one embodiment, a unit for measurement of the target timing adjustment and a unit for measurement of any of the X candidate timing adjustments are the same.

In one embodiment, the target timing adjustment is equal to an integer number of Tc(s) in 3GPP TS38.211 (v15.1.0).

In one embodiment, the target timing adjustment is related to a vertical height of a receiver of the first radio signal.

In one embodiment, the target timing adjustment is related to a minimum delay of a receiver of the first radio signal to reach the ground.

In one embodiment, the target timing adjustment is related to a Round Trip Time (RTT) between a receiver of the first radio signal and a transmitter of the first radio signal.

In one embodiment, the target timing adjustment is related to a type of a receiver of the first radio signal (a geostationary satellite, a Low Earth Orbit satellite, a flying platform, etc.).

In one embodiment, a transmitter of the first radio signal selecting a candidate timing offset corresponding to the first timing adjustment out of the X candidate timing offsets by itself means that a transmitter of the first radio signal randomly selects a candidate timing offset corresponding to the first timing adjustment out of the X candidate timing offsets.

In one embodiment, a transmitter of the first radio signal selecting a candidate timing offset corresponding to the first timing adjustment out of the X candidate timing offsets by itself means that a transmitter of the first radio signal selects a candidate timing offset corresponding to the first timing adjustment out of the X candidate timing offsets according to a geographic position when transmitting the first radio signal.

In one embodiment, a transmitter of the first radio signal selecting a candidate timing offset corresponding to the first timing adjustment out of the X candidate timing offsets by itself means that a transmitter of the first radio signal selects a candidate timing offset corresponding to the first timing adjustment out of the X candidate timing offsets according to a moving speed when transmitting the first radio signal.

In one embodiment, a transmitter of the first radio signal selecting a candidate timing offset corresponding to the first timing adjustment out of the X candidate timing offsets by itself means that a transmitter of the first radio signal selects a candidate timing offset corresponding to the first timing adjustment out of the X candidate timing offsets according to a crystal-oscillator offset when transmitting the first radio signal.

In one embodiment, a method that a transmitter of the first radio signal selects a candidate timing offset corresponding to the first timing adjustment out of the X candidate timing offsets by itself is implementation dependent.

In one embodiment, the X candidate timing offsets being related to at least one of the target timing adjustment or an SCS of subcarriers occupied by the first radio signal means that at least one of the target timing adjustment or an SCS of subcarriers occupied by the first radio signal is used for determining the X candidate timing offsets.

In one embodiment, the X candidate timing offsets being related to at least one of the target timing adjustment or an SCS of subcarriers occupied by the first radio signal means that at least one of the target timing adjustment or an SCS of subcarriers occupied by the first radio signal based on a specific mapping relation is used for determining the X candidate timing offsets.

In one embodiment, the X candidate timing offsets being related to at least one of the target timing adjustment or an SCS of subcarriers occupied by the first radio signal means that at least one of the target timing adjustment or an SCS of subcarriers occupied by the first radio signal based on a specific functional relationship is used for determining the X candidate timing offsets.

In one embodiment, the X candidate timing offsets being related to at least one of the target timing adjustment or an SCS of subcarriers occupied by the first radio signal means that at least one of the target timing adjustment or an SCS of subcarriers occupied by the first radio signal based on a specific mapping table is used for determining the X candidate timing offsets.

In one embodiment, the X candidate timing offsets being related to at least one of the target timing adjustment or an SCS of subcarriers occupied by the first radio signal means that the X candidate timing offsets vary with at least one of the target timing adjustment or a SCS of subcarriers occupied by the first radio signal.

In one embodiment, the X candidate timing offsets are also related with factors other than the target timing adjustment and a SCS of subcarriers occupied by the first radio signal.

In one embodiment, an SCS of subcarriers occupied by the first radio signal is equal to 15 kHz multiplied by a non-negative integer power of 2.

In one embodiment, an SCS of subcarriers occupied by the first radio signal is equal to one of 15 kHz, 30 kHz, 60 kHz, 120 kHz, 240 kHz, 480 kHz or 960 kHz.

In one embodiment, a transmitter of the first radio signal determining the first timing adjustment out of the X candidate timing adjustments by itself means that a transmitter of the first radio signal selects a candidate timing offset corresponding to the first timing adjustment out of the X candidate timing offsets by itself so as to determine the first timing adjustment.

Embodiment 10

Embodiment 10 illustrates a schematic diagram of a relation between a minimum adjustment step-size of a target timing adjustment and an SCS of subcarriers occupied by a first radio signal according to one embodiment of the present disclosure, as shown in FIG. 10. In FIG. 10, the first column represents SCSs of subcarriers occupied by the first radio signal, and the second column represents minimum step-sizes of target timing adjustments, wherein Tc is equal to $1/(480 \times 10^3 \times 4096)$ second.

In Embodiment 10, a minimum adjustment step-size of the target timing adjustment in the present disclosure is related to an SCS of subcarriers occupied by the first radio signal in the present disclosure.

In one embodiment, a minimum adjustment step-size of the target timing adjustment being related to an SCS of subcarriers occupied by the first radio signal means that an SCS of subcarriers occupied by the first radio signal is used for determining a minimum adjustment step-size of the target timing adjustment.

In one embodiment, a minimum adjustment step-size of the target timing adjustment being related to an SCS of subcarriers occupied by the first radio signal means that an SCS of subcarriers occupied by the first radio signal is used for determining a minimum adjustment step-size of the target timing adjustment through a given mapping relation.

In one embodiment, a minimum adjustment step-size of the target timing adjustment being related to an SCS of subcarriers occupied by the first radio signal means that an SCS of subcarriers occupied by the first radio signal is used for determining a minimum adjustment step-size of the target timing adjustment through a given functional relationship.

In one embodiment, a minimum adjustment step-size of the target timing adjustment being related to an SCS of subcarriers occupied by the first radio signal means that an SCS of subcarriers occupied by the first radio signal is used for determining a minimum adjustment step-size of the target timing adjustment through a given mapping table.

In one embodiment, a minimum adjustment step-size of the target timing adjustment being related to an SCS of subcarriers occupied by the first radio signal means that a minimum adjustment step-size of the target timing adjustment vary with an SCS of subcarriers occupied by the first radio signal.

In one embodiment, a minimum adjustment step-size of the target timing adjustment is also related to factors other than an SCS of subcarriers occupied by the first radio signal.

In one embodiment, a minimum adjustment step-size of the target timing adjustment is only related to factors other than an SCS of subcarriers occupied by the first radio signal.

In one embodiment, a minimum step-size of the target timing adjustment is an absolute difference with a minimum change that the target timing adjustment can be changed.

In one embodiment, a minimum step-size of the target timing adjustment is equal to $16 \cdot 64 \cdot T_c/2^\mu$ in 3GPP TS38.213 (v15.1.0), section 4.2.

In one embodiment, a minimum step-size of the target timing adjustment is equal to $16 \cdot 64 \cdot T_c/2^\mu$, wherein $2^\mu \cdot 15$ kHz is an SCS of subcarriers occupied by the first radio signal, and the definition of Tc can be found in 3GPP TS38.211 (v15.1.0), section 4.3.1.

In one embodiment, a minimum adjustment step-size of the target timing adjustment is also related to a vertical height of a receiver of the first radio signal.

In one embodiment, a minimum adjustment step-size of the target timing adjustment is also related to a minimum delay of a receiver of the first radio signal to reach the ground.

In one embodiment, a minimum adjustment step-size of the target timing adjustment is also related to an RTT between a receiver of the first radio signal and a transmitter of the first radio signal.

In one embodiment, a minimum adjustment step-size of the target timing adjustment is also related to a type of a receiver of the first radio signal (a geostationary satellite, a Low Earth Orbit satellite, a flying platform, etc.).

Embodiment 11

Figure 11:
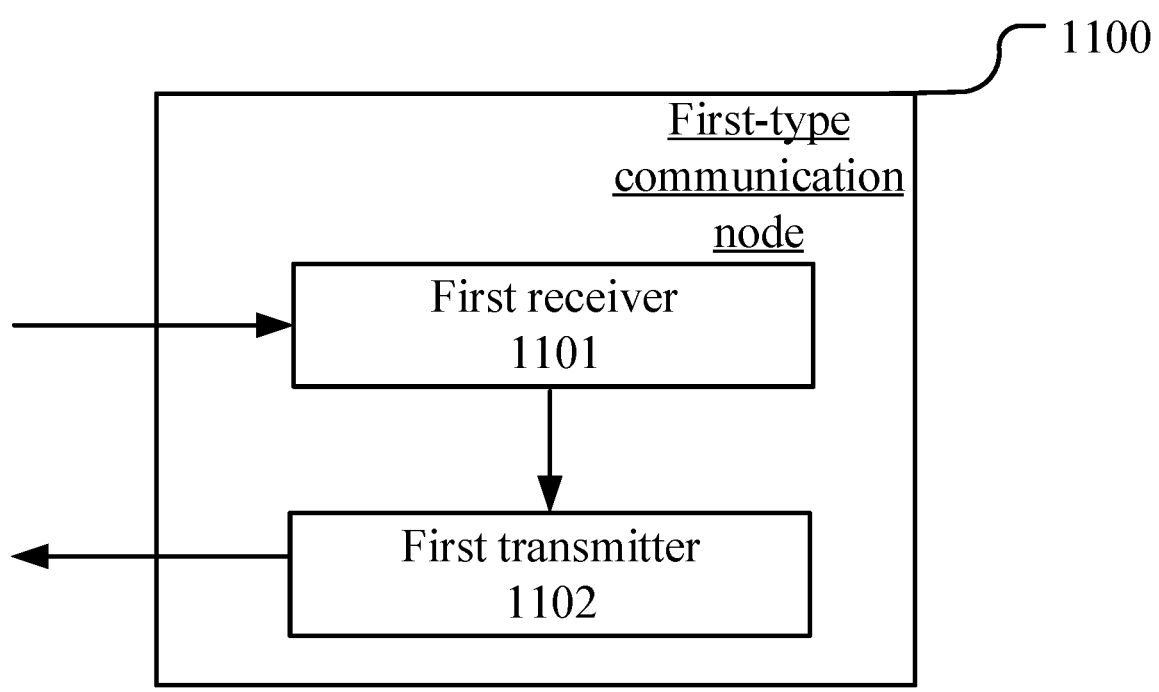
FIG. 11 illustrates a structure block diagram of a processing device in a first-type communication node according to one embodiment of the present disclosure.

Embodiment 11 illustrates a structure block diagram of a processing device in a first-type communication node, as shown in FIG. 11. In FIG. 11, the first-type communication node processing device 1100 mainly consists of a first receiver 1101 and a first transmitter 1102. The first receiver 1101 comprises the transmitter/receiver 456 (including the antenna 460), the receiving processor 452 and the controller/processor 490 in FIG. 4 of the present disclosure; the first transmitter 1102 comprises the transmitter/receiver 456 (including the antenna 460), the transmitting processor 455 and the controller/processor 490 in FIG. 4 of the present disclosure.

In Embodiment 11, the first receiver 1101 receives first information; the first transmitter 1102 transmits a first radio signal; herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface.

In one embodiment, the first receiver 1101 also receives a second radio signal; and the second radio signal is used for determining the first reference time.

In one embodiment, the first transmitter 1102 also transmits a third radio signal; herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; a start time for transmitting the third radio signal is earlier than a start time for transmitting the first radio signal.

In one embodiment, the first receiver 1101 also receives second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; and the second information is transmitted via the air interface.

In one embodiment, the first receiver 1101 also receives second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface; a minimum adjustment step-size of the target timing adjustment is related to an SCS of subcarriers occupied by the first radio signal.

In one embodiment, the first receiver 1101 also receives third information; herein, the third information is used for determining an SCS of subcarriers occupied by the first radio signal; and the third information is transmitted via the air interface.

Embodiment 12

Figure 12:
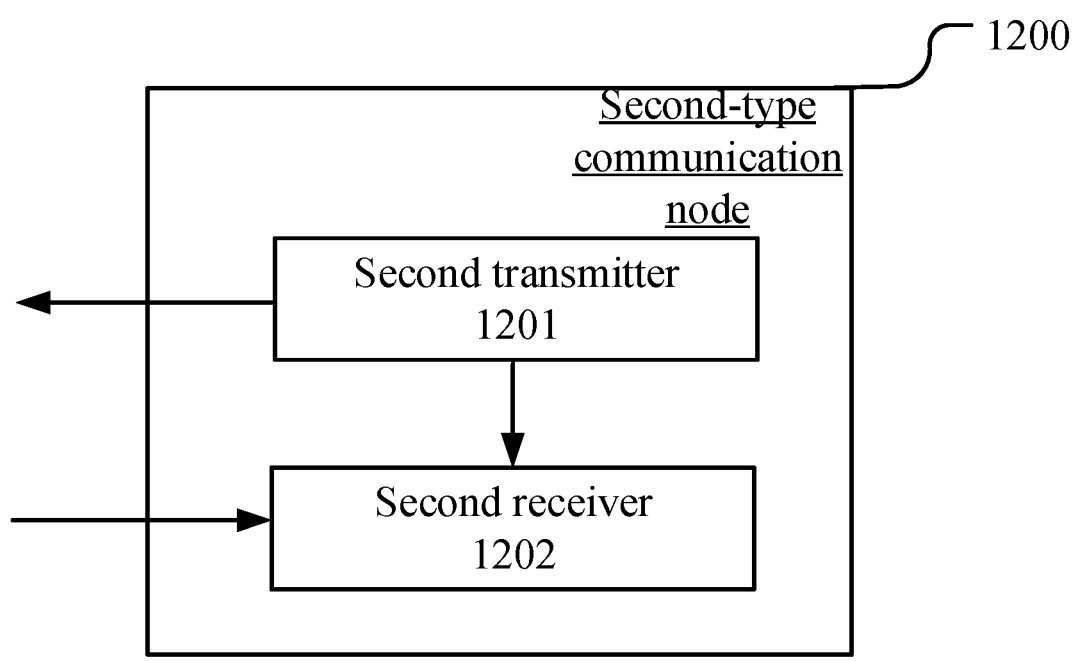
FIG. 12 illustrates a structure block diagram of a processing device in a second-type communication node according to one embodiment of the present disclosure.

Embodiment 12 illustrates a structure block diagram of a processing device in a second-type communication node, as shown in FIG. 12. In FIG. 12, the second-type communication node processing device 1200 mainly consists of a second transmitter 1201 and a second receiver 1202. The second transmitter 1201 comprises the transmitter/receiver 416 (including the antenna 420), the transmitting processor 415 and the controller/processor 440 in FIG. 4 of the present disclosure; and the second receiver 1202 comprises the transmitter/receiver 416 (including the antenna 420), the receiving processor 412 and the controller/processor 440 in FIG. 4 of the present disclosure.

In embodiment 12, the second transmitter 1201 transmits first information; the second receiver 1202 receives a first radio signal; herein, a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface.

In one embodiment, the second transmitter 1201 also transmits a second radio signal; herein, the second radio signal is used for determining the first reference time.

In one embodiment, the second receiver 1202 also receives a third radio signal; herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; and a start time for transmitting the third radio signal is earlier than a start time for transmitting the first radio signal.

In one embodiment, the second transmitter 1201 also transmits second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; and the second information is transmitted via the air interface.

In one embodiment, the second transmitter 1201 also transmits second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; the second information is transmitted via the air interface; a minimum adjustment step-size of the target timing adjustment is related to an SCS of subcarriers occupied by the first radio signal.

In one embodiment, the second transmitter 1201 also transmits third information, and the third information is used for determining an SCS of subcarriers occupied by the first radio signal; the third information is transmitted via the air interface.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first-type communication node or UE or terminal in the present disclosure includes but not limited to mobile phones, tablet computers, laptops, network cards, low-consumption equipment, eMTC equipment, NB-IOT terminals, vehicle-mounted equipment, aircrafts, airplanes, unmanned aerial vehicles (UAV), tele-controlled aircrafts, etc. The second-type communication node or the base station or the network-side equipment in the present disclosure includes but is not limited to macro-cellular base stations, micro-cellular base stations, home base stations, relay base stations, eNB, gNB, Transmitting and Receiving Point (TRP), relay satellites, satellite base stations, air base stations and other wireless communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communications, comprising:
   receiving first information; and
   transmitting a first radio signal;
   wherein a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface; a start time for transmitting the first radio signal is no later than the first reference time, a length of a time interval between a start time for transmitting the first radio signal and the first reference time is equal to a value of a TA of the first radio signal; the first information comprises all or part of a higher-layer signaling, the first information is transmitted through a Downlink Shared Channel (DL-SCH), the first information is Cell-Specific.

2. The method according to claim 1, also comprising:
   receiving a second radio signal;
   wherein the second radio signal is used for determining the first reference time; the second radio signal is used for determining a timing of a downlink radio frame, and the first reference time is a boundary time of a downlink radio frame; the second radio signal comprises a Primary Synchronization Signal (PSS) and a Secondary Synchronization Signal (SSS).

3. The method according to claim 1, also comprising:
   transmitting a third radio signal;
   wherein the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; and a start time for transmitting the third radio signal is earlier than a start time for transmitting the first radio signal; a transmitter of the third radio signal selects the third timing adjustment out of the Y candidate timing adjustments according to a geographic position of the transmitter of the third radio signal when transmitting the third radio signal.

4. The method according to claim 1, also comprising:
receiving second information;
wherein the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or a subcarrier spacing (SCS) of subcarriers occupied by the first radio signal; and the second information is transmitted via the air interface; the first information and the second information are transmitted as two different fields in a same signaling, the second information is transmitted through a higher-layer signaling.

5. The method according to claim 4, wherein a minimum adjustment step-size of the target timing adjustment is related to an SCS of subcarriers occupied by the first radio signal; a minimum step-size of the target timing adjustment is equal to $16 \cdot 64 \cdot T_c/2^\mu$, wherein $2^\mu \cdot 15$ kHz is an SCS of subcarriers occupied by the first radio signal.

6. The method according to claim 1, also comprising:
receiving third information;
wherein the third information is used for determining an SCS of subcarriers occupied by the first radio signal; and the third information is transmitted via the air interface; the third information comprises all or part of IEs in an RRC signaling or the third information comprises all or part of Fields of a DCI signaling.

7. The method according to claim 1, wherein a transmitter of the first radio signal selects the first timing adjustment out of the X candidate timing adjustments according to a geographic position of the transmitter of the first radio signal when transmitting the first radio signal, or the transmitter of the first radio signal selects the first timing adjustment out of the X candidate timing adjustments according to a moving speed of the transmitter of the first radio signal when transmitting the first radio signal, or the transmitter of the first radio signal selects the first timing adjustment out of the X candidate timing adjustments according to a crystal-oscillator offset of the transmitter of the first radio signal when transmitting the first radio signal.

8. A first-type communication node for wireless communications, comprising:
a first receiver, receiving first information; and
a first transmitter, transmitting a first radio signal;
wherein a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface; a start time for transmitting the first radio signal is no later than the first reference time, a length of a time interval between a start time for transmitting the first radio signal and the first reference time is equal to a value of a TA of the first radio signal; the first information comprises all or part of a higher-layer signaling, the first information is transmitted through a Downlink Shared Channel (DL-SCH), the first information is Cell-Specific.

9. The first-type communication node according to claim 8, wherein the first receiver receives a second radio signal; herein, the second radio signal is used for determining the first reference time; the second radio signal is used for determining a timing of a downlink radio frame, and the first reference time is a boundary time of a downlink radio frame; the second radio signal comprises a Primary Synchronization Signal (PSS) and a Secondary Synchronization Signal (SSS).

10. The first-type communication node according to claim 8, wherein the first transmitter transmits a third radio signal; herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; and a start time for transmitting the third radio signal is earlier than a start time for transmitting the first radio signal; a transmitter of the third radio signal selects the third timing adjustment out of the Y candidate timing adjustments according to a geographic position of the transmitter of the third radio signal when transmitting the third radio signal.

11. The first-type communication node according to claim 8, wherein the first receiver receives second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; and the second information is transmitted via the air interface; the first information and the second information are transmitted as two different fields in a same signaling, the second information is transmitted through a higher-layer signaling.

12. The first-type communication node according to claim 11, wherein a minimum adjustment step-size of the target timing adjustment is related to an SCS of subcarriers occupied by the first radio signal; a minimum step-size of the target timing adjustment is equal to $16 \cdot 64 \cdot T_c/2^\mu$, wherein $2^\mu \cdot 15$ kHz is an SCS of subcarriers occupied by the first radio signal.

13. The first-type communication node according to claim 8, wherein the first receiver receives third information; herein, the third information is used for determining an SCS of subcarriers occupied by the first radio signal; and the third information is transmitted via the air interface; the third information comprises all or part of IEs in an RRC signaling or the third information comprises all or part of Fields of a DCI signaling.

14. The first-type communication node according to claim 8, wherein a transmitter of the first radio signal selects the first timing adjustment out of the X candidate timing adjustments according to a geographic position of the transmitter of the first radio signal when transmitting the first radio signal, or the transmitter of the first radio signal selects the first timing adjustment out of the X candidate timing adjustments according to a moving speed of the transmitter of the first radio signal when transmitting the first radio signal, or the transmitter of the first radio signal selects the first timing adjustment out of the X candidate timing adjustments according to a crystal-oscillator offset of the transmitter of the first radio signal when transmitting the first radio signal.

15. A second-type communication node for wireless communications, comprising:
a second transmitter, transmitting first information; and
a second receiver, receiving a first radio signal;
wherein a length of a time interval between a start time for transmitting the first radio signal and a first reference time is equal to a sum of a first timing adjustment and a second timing adjustment, the first timing adjustment being one of X candidate timing adjustments, the X being a positive integer greater than 1; the second timing adjustment is used for determining a transmission timing of a radio signal transmitted before the first radio signal in time domain; a transmitter of the first radio signal determines the first timing adjustment out of the X candidate timing adjustments by itself, and the first information is used for determining the X candidate timing adjustments; and the first information is transmitted via an air interface; a start time for transmitting the first radio signal is no later than the first reference time, a length of a time interval between a start time for transmitting the first radio signal and the first reference time is equal to a value of a TA of the first radio signal; the first information comprises all or part of a higher-layer signaling, the first information is transmitted through a Downlink Shared Channel (DL-SCH), the first information is Cell-Specific.

16. The second-type communication node according to claim 15, wherein the second transmitter transmits a second radio signal; herein, the second radio signal is used for determining the first reference time; the second radio signal is used for determining a timing of a downlink radio frame, and the first reference time is a boundary time of a downlink radio frame; the second radio signal comprises a Primary Synchronization Signal (PSS) and a Secondary Synchronization Signal (SSS).

17. The second-type communication node according to claim 15, wherein the second receiver receives a third radio signal; herein, the second timing adjustment is used for determining a transmission timing of the third radio signal, or a sum of the second timing adjustment and a third timing adjustment is used for determining a transmission timing of the third radio signal; the third timing adjustment is one of Y candidate timing adjustments, and a transmitter of the third radio signal determines the third timing adjustment out of the Y candidate timing adjustments by itself, the Y being a positive integer greater than 1; and a start time for transmitting the third radio signal is earlier than a start time for transmitting the first radio signal; a transmitter of the third radio signal selects the third timing adjustment out of the Y candidate timing adjustments according to a geographic position of the transmitter of the third radio signal when transmitting the third radio signal.

18. The second-type communication node according to claim 15, wherein the second transmitter transmits second information; herein, the X candidate timing adjustments are respectively equal to X candidate timing offsets plus a target timing adjustment, the second information is used for determining the target timing adjustment, and a transmitter of the first radio signal selects a candidate timing offset corresponding to the first timing adjustment out of the X candidate timing offsets by itself; the first information is used for indicating the X candidate timing offsets, or that the X candidate timing offsets are related to at least one of the target timing adjustment or an SCS of subcarriers occupied by the first radio signal; and the second information is transmitted via the air interface; the first information and the second information are transmitted as two different fields in a same signaling, the second information is transmitted through a higher-layer signaling; a minimum adjustment step-size of the target timing adjustment is related to an SCS of subcarriers occupied by the first radio signal; a minimum step-size of the target timing adjustment is equal to $16 \cdot 64 \cdot T_c/2^\mu$, wherein $2^\mu \cdot 15$ kHz is an SCS of subcarriers occupied by the first radio signal.

19. The second-type communication node according to claim 15, wherein the second transmitter transmits third information, the third information being used for determining an SCS of subcarriers occupied by the first radio signal; and the third information is transmitted via the air interface; the third information comprises all or part of IEs in an RRC signaling or the third information comprises all or part of Fields of a DCI signaling.

20. The second-type communication node according to claim 15, wherein a transmitter of the first radio signal selects the first timing adjustment out of the X candidate timing adjustments according to a geographic position of the transmitter of the first radio signal when transmitting the first radio signal, or the transmitter of the first radio signal selects the first timing adjustment out of the X candidate timing adjustments according to a moving speed of the transmitter of the first radio signal when transmitting the first radio signal, or the transmitter of the first radio signal selects the first timing adjustment out of the X candidate timing adjustments according to a crystal-oscillator offset of the transmitter of the first radio signal when transmitting the first radio signal.

* * * * *